Patented Apr. 16, 1946

2,398,367

UNITED STATES PATENT OFFICE 2,398,367

AZO-DYESTUFFS

Friedrich Felix and Alphonse Heckendorn, Basel, Switzerland, assignors to the firm of Society of Chemical Industry in Basle, Basel, Switzerland No Drawing. Application May 24, 1943, Serial No. 488,264. In Switzerland July 2, 1942

5 Claims. (Cl. 260—207)

It has been found that the hitherto unknown azo-dyestuffs of the general formula

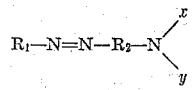

wherein $R_1$ and $R_2$ stand for aromatic radicals of the benzene series of which one radical contains a hydroxyl group in ortho-position to the azo-group, the

group stands in 4-position to the azo-group, $x$ stands for a member of the group consisting of a hydrogen atom and a lower alkyl radical, $y$ stands for an acyl radical containing a salt-forming group selected from the group consisting of carboxyl groups and sulfonic groups, and wherein finally the two aromatic radicals $R_1$ and $R_2$, besides containing the above mentioned hydroxyl group in ortho-position to the azo-group, are free from further aromatically bound hydroxyl, carboxyl or sulfonic groups, represent valuable products.

The new dyestuffs are soluble in water, especially in the form of their alkali or ammonium salts. They may be used for dyeing or printing animal fibers, for example, wool and silk, especially, however, for dyeing and printing artificial structures from acetyl cellulose, such as acetate rayon, further from superpolyamides and polyurethanes, yellow to red tints being preferably obtained.

The new dyestuffs are made by the application of methods known to be suitable for making dyestuffs having such a general formula.

A modification of this manufacturing process consists in treating aminoazo-dyestuffs of the general formula

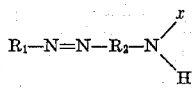

wherein $R_1$ $R_2$ and $x$ have the already indicated signification, in such a manner with polybasic organic acids or their reactive derivatives, that the amino-group is acidylated by a radical which still contains a salt-forming group selected from the group consisting of the carboxyl group and of the sulfonic group.

A further modification of the manufacturing process for the new dyestuffs consists in diazotizing primary amines of the general formula

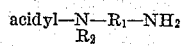

wherein the $NH_2$ group and the acidylamino group stand in 1:4-position to one another, $R_1$ stands for an aromatic nucleus of the benzene series which is free from aromatically bound hydroxyl groups, carboxyl groups or sulfonic groups, and $R_2$ stands for hydrogen or a lower alkyl, the acidyl radical containing a salt-forming group which is selected itself from the group consisting of sulfonic groups and carboxyl groups, and coupling the diazotized amines with such monovalent phenols which couple in ortho-position to the hydroxyl group and do not contain aromatically bound sulfonic groups or carboxyl groups.

The dyestuffs used as starting products in the first of the above described modifications of the manufacture for the new dyestuffs can be prepared for example by coupling diazotized ortho-aminophenols and primary or secondary amines of the benzene series, thus, for instance, diazotized 1-hydroxy-2-amino-4 nitrobenzene with 1-amino-3-methylbenzene.

The following ortho-aminophenols may, for example, be used: 1-hydroxy-2-aminobenzene, 1-hydroxy-2-amino-4-methylbenzene, 1-hydroxy-2-amino-5-methylbenzene, 1-hydroxy-2-amino-6-methylbenzene, 1-hydroxy-2-amino-4-chlorobenzene, 1-hydroxy-2-amino-5-chlorobenzene, 1-hydroxy-2-amino-6-chlorobenzene, 1-hydroxy-2-amino-4-methoxybenzene, 1-hydroxy-2-amino-4-nitrobenzene, 1-hydroxy-2-amino-5-nitrobenzene, 1-hydroxy-2-amino-4-methyl-6-nitrobenzene, 1-hydroxy-2-amino-4-nitro-6-chlorobenzene, 1-hydroxy-2-amino-4- or -6-nitrobenzene, 1-hydroxy-2-amino-4:6-dinitrobenzene, 1-hydroxy-2-aminobenzene-4-sulfamide, 1-hydroxy-2-aminobenzene-4-ethylsulfamide, 1-hydroxy-2-aminobenzene-2-hydroxyethylsulfone and the like.

These aminophenols are therefore diazotized and coupled inter alia with the following primary or secondary aromatic amines of the benzene series, care having to be taken that when the ortho-aminophenols yield inert diazo compounds, their esters with aromatic sulfonic acids, for example, benzene sulfonic acid or toluene sulfonic acid are diazotized, these sulfonic acids being easily split off by treating the dyestuffs with saponifying agents: 1-aminobenzene, 1-methylaminobenzene, 1-ethylaminobenzene, 1 - amino - 2 - methylbenzene, 1-amino-3-methylbenzene, 1 - amino - 2 - ethoxybenzene, 1 - methylamino - 3 - methylbenzene, 1-amino-2-methoxybenzene, 1-methylamino-2-methoxybenzene, 1-ethylamino-2-methoxybenzene, 1-amino-3-methoxybenzene, 1-amino-2-methoxy-5-methylbenzene, 1 - amino - 2:5 - dimethoxybenzene, 1-butylamino-2:5-dimethylbenzene, 1-propylamino-3-chlorobenzene, 1-amino-3-acetylaminobenzene, and the like. Such dyestuffs have become known by the U. S. Patent No. 1,848,772 to Felix. It follows from this enumeration that the expression "lower alkyl radical" in the explanation of the foregoing general formula

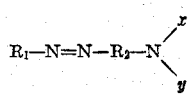

comprises such an alkyl radical which contains at the most four carbon atoms linked with one another. Moreover, this lower alkyl radical can also contain substituents, such as halogen atoms, alkoxy groups, hydroxyl groups or carboxyl groups.

According to the process of the present invention these dyestuffs are to be treated with polybasic organic acids in such a manner that an acidyl radical enters into the primary or secondary amino group which contains a salt-forming group selected from the group consisting of sulfonic groups and carboxyl groups.

Among these polybasic organic acids there may be mentioned above all polybasic carboxylic acids or sulfocarboxylic acids, for example, oxalic acid, malonic acid, succinic acid, maleic acid, fumaric acid, glutaric acid, adipinic acid, pimelic acid, suberic acid, phthalic acid, chlorophthalic acids, isophthalic acid, naphthalic acid, further sulfocarboxylic acids, for example, sulfoacetic acid, sulfochloroacetic acid, sulfosuccinic acid, sulfophthalic acid, sulfonaphthalic acid, sulfosalicylic acid and the like. These compounds can be applied preferably in the form of their reactive derivatives, especially in the form of their halides, for example chlorides, in the form of their esters with low boiling alcohols or of their anhydrides. The reaction can also be effected by heating the dyestuffs with the indicated acidylating agents; this operation can be carried out in solvents, for example in benzene, toluene, chlorobenzene, solvent naphtha, or also in other solvents, such as alcohols, for example, methyl or ethyl alcohol. If acid, for example, hydrochloric acid, is split off by the acylation, an acid-binding agent is preferably used, for example, sodium acetate, sodium bicarbonate, sodium carbonate, calcium hydroxide, calcium carbonate, magnesium oxide, and the like, or a solvent having basic properties is used, for example dimethylaminobenzene or pyridine. If water is formed in the acylation, for example, in those cases where acids, for example oxalic acid or phthalic acid, are used, working is effected preferably in an organic solvent, and the water thus formed is distilled off in a circulation system with part of the solvent.

Among the components which may be used for the production of the new dyestuffs according to the second modification of the present process, there may be mentioned amines, for example, the monoamide from 1 mol. maleic acid or 1 mol. succinic acid or 1 mol. sulfophthalic acid or also 1 mol. sulfoacetic acid and 1 mol. 1:4-diaminobenzene or 1:4 - diamino - 3 - methoxybenzene (whereby the one or the other $NH_2$-group is acylated) or corresponding 1:3-diaminobenzene derivatives and phenols such as 1-hydroxy-4-methylbenzene, 1-hydroxy-3:4-dimethylbenzene, 1-hydroxy - 3 - chloro - 4 - methylbenzene, 1-hydroxy-3-methyl-4-chlorobenzene, further compounds such as 1:3-aminohydroxybenzene, coupling being carried out in such a manner that an ortho-hydroxyazo-dyestuff is formed and, if necessary, the amino group is acylated after coupling is complete.

The following products are typical representatives of the new dyestuffs produced according to the first above described modification of the present new process:

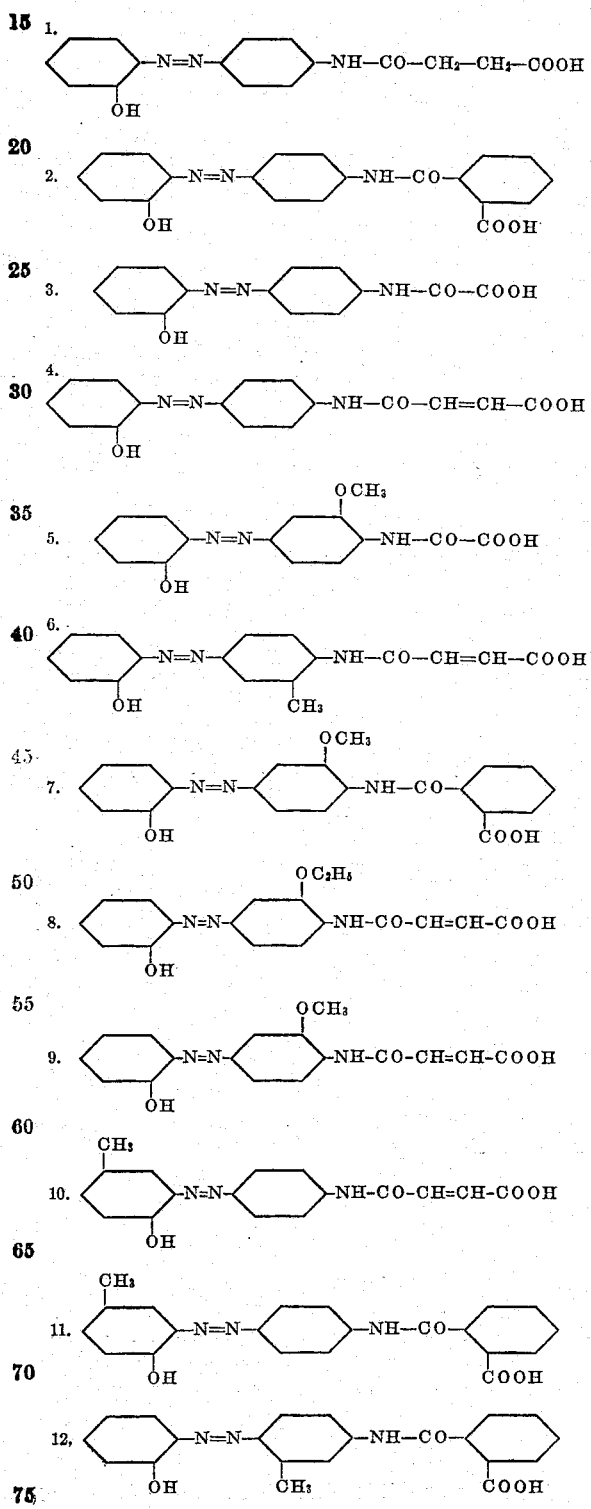

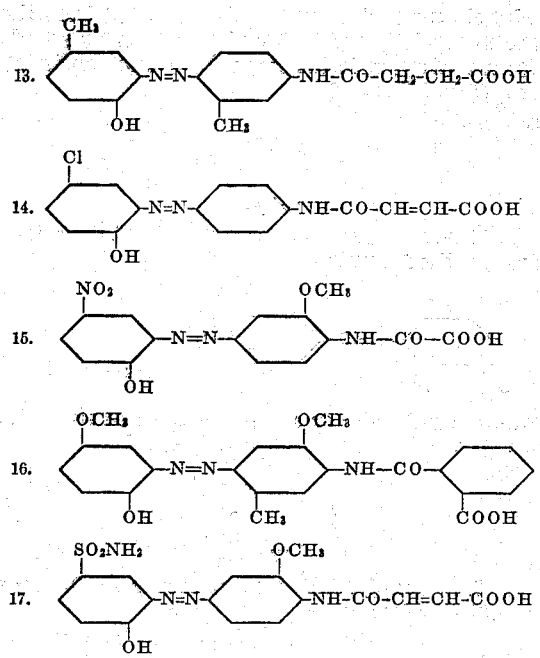

The following dyestuffs, inter alia, are obtained according to the modification which consists in coupling aromatic diazo compounds which possess an acylamino group containing a radical imparting solubility in water, with phenols coupling in ortho-position to the hydroxyl group:

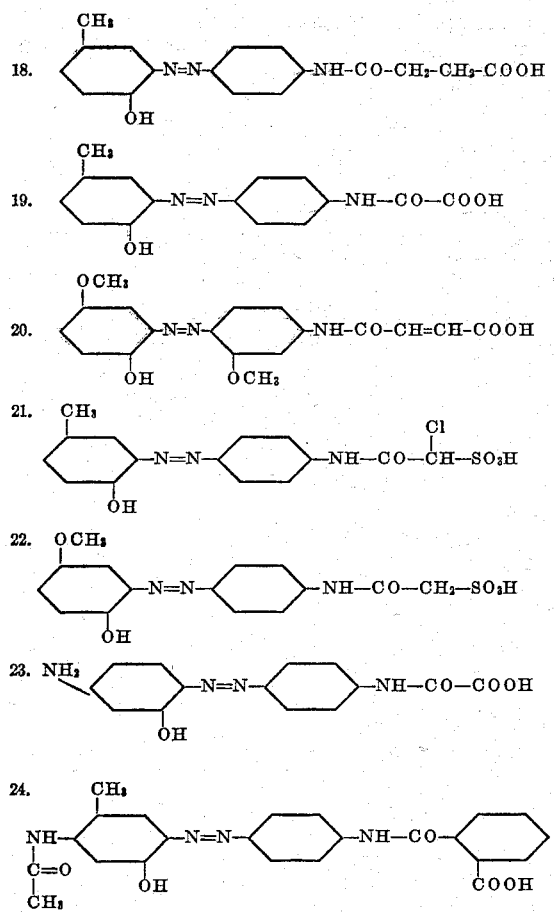

All these dyestuffs possess substantially the properties idicated in the introduction. A series of these dyestuffs in particular represent valuable dyestuffs for the production of interesting shades on products such as acetate rayon and superpolyamide rayon.

The following examples illustrate the invention, but are not to be regarded as limiting it in any way, the parts being by weight:

*Example 1*

26.3 parts of the para-toluenesulfonic ester of 1-hydroxy-2-aminobenzene are ground for 12 hours with 25 parts of water and 25 parts of concentrated hydrochloric acid and diazotized in the presence of ice with 70 parts of aqueous sodium nitrite solution of 10 per cent strength. After stirring for about 1 hour the whole is filtered to remove the insoluble residues and coupling is effected by slowly introducing the filtered solution into an ice cold solution of the sodium salt of the ω-methane sulfonic acid of ortho-anisidine which is obtained by dissolving 12.3 parts of ortho-anisidine in the mixture of sodium bisulfite and formaldehyde solution which has been made exactly neutral. Coupling takes place in the presence 50 parts of sodium acetate, so that the dyestuff formation proceeds in acetic acid solution right from the beginning. When coupling is complete the dyestuff is suction-filtered, washed completely neutral with a common salt solution of 10 per cent strength and the dry content is determined by drying a small sample. The still moist filter cake is then dissolved in 300 parts of alcohol by stirring in a reflux apparatus and saponified at the boil for 1 hour with 30 parts by volume of caustic soda solution of 30 per cent strength. After cooling the solution is mixed with 16-17 parts of concentrated hydrochloric acid, diluted with 150 parts of water and 250-300 parts of alcohol are distilled from the mixture. The precipitated hard product is suction-filtered when cold, washed and dried. The insoluble dyestuff thus obtained is treated in 300 parts of chlorobenzene with 16.3 parts of phthalic anhydride at about 50-60° C. It is allowed to cool and the precipitated acylated product is filtered. The dyestuff which has been freed from chlorobenzene by drying, if necessary in a vacuum, is stirred in pure water and neutralized with an alkali, for example ammonia, then completely salted out and filtered. The dry ammonium salt of the dyestuff forms a yellow-brown powder which dissolves in water to a yellow solution and dyes acetate rayon from an aqueous solution yellow tints. The new dyestuff, in the free form, corresponds to the formula No. 7 on page 2.

A dyestuff which behaves similarly is obtained when using 11 parts of maleic anhydride instead of phthalic anhydride.

When treating the parent dyestuff in benzene with about 15 parts of dry oxalic acid and removing the water which has formed by distillation, a dyestuff having the same properties can be obtained when working up in similar manner.

Further dyestuffs can be prepared according to the data in the introduction.

*Example 2*

22.7 parts of the dyestuff obtained by diazotizing the para-toluenesulfonic acid ester of 1-hydroxy-2-aminobenzene, coupling this diazo compound with the ω-methane sulfonic acid of 1-amino-2-methylbenzene, splitting off the ω-methane sulfonic acid radical and the toluene sulfonic acid with alcoholic alkali, are treated for 2 hours at about 70° C. in 200 parts of acetic ester with 11 parts of maleic anhydride. The acetic ester is distilled off in the water bath and finally completely removed in a vacuum. The residue is dissolved with dilute aqueous ammonium solution, filtered if necessary, and the strongly cooled solution is gradually precipitated with common salt. The precipitated ammonium salt of the dyestuff is filtered and dried. The dyestuff forms a yellow brown powder which dissolves in water to a yellow solution and dyes acetate rayon from an aqueous bath fast yellow tints. The new dyestuff, in the free form, corresponds to the formula No. 6 on page 2.

The procedure is similar when using 11 parts of succinic anhydride or 16 parts of phthalic anhydride instead of the maleic anhydride used here. Instead of acetic ester there may also be used benzene, toluene or solvent naphtha. Furthermore, the reaction temperatures and the duration of the reactions may be varied within certain limits.

Dyestuffs, for example those obtained by diazotizing ortho-anisidine or para-chloroaniline and coupling these diazo compounds with meta-aminophenol, are treated in similar manner with these anhydrides. These dyestuffs dye also yellow tints.

*Example 3*

1.5 parts of the dyestuff of Example 2 are dissolved in 3000 parts of water. 40 parts of crystallized sodium sulfate are added to the dye-bath and 100 parts of acetate rayon yarn are treated therein during 1 hour at 80° C. After rinsing and drying there is obtained an acetate rayon which is dyed pure yellow tints. The dyeing is fast to light; combination dyeings are not phototropic.

*Example 4*

1 part of the dyestuff of Example 1 is dissolved in 10 parts of warm water. 65 parts of a gum thickening containing 5 parts of glycerine are introduced into this solution. The whole is stirred and made up to 100 parts by addition of water. The material is printed, dried and steamed in a kier, thoroughly rinsed and dried. There is obtained a yellow printed material.

What we claim is:

1. The azo-dyestuffs corresponding in the free form to the formula

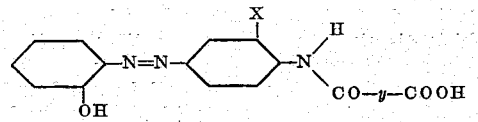

wherein $x$ stands for a member selected from the group consisting of $CH_3$ and $OCH_3$, and $y$ stands for a member selected from the group consisting of $-CH=CH-$ and

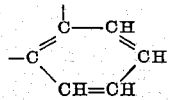

2. The azo-dyestuffs corresponding in the free form to the formula

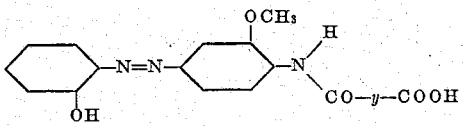

wherein $y$ stands for a member selected from the group consisting of $-CH=CH-$ and

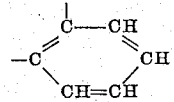

3. The azo-dyestuff corresponding in the free form to the formula

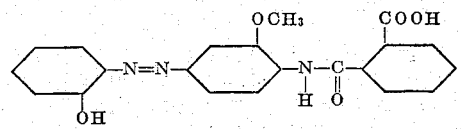

4. The azo-dyestuff corresponding in the free form to the formula

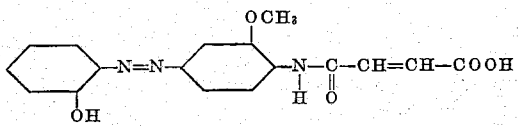

5. The azo-dyestuff corresponding in the free form to the formula

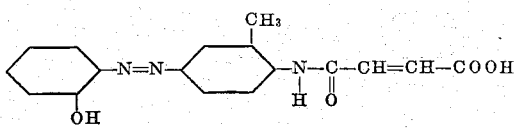

FRIEDRICH FELIX.
ALPHONSE HECKENDORN.